April 3, 1962 G. M. SOMMER 3,027,793
DIE CLAMP

Filed Dec. 31, 1957 3 Sheets-Sheet 1

INVENTOR.
GORDON M. SOMMER
BY
Marzall, Johnston, Cook & Root
ATTORNEYS

April 3, 1962  G. M. SOMMER  3,027,793
DIE CLAMP
Filed Dec. 31, 1957  3 Sheets-Sheet 2
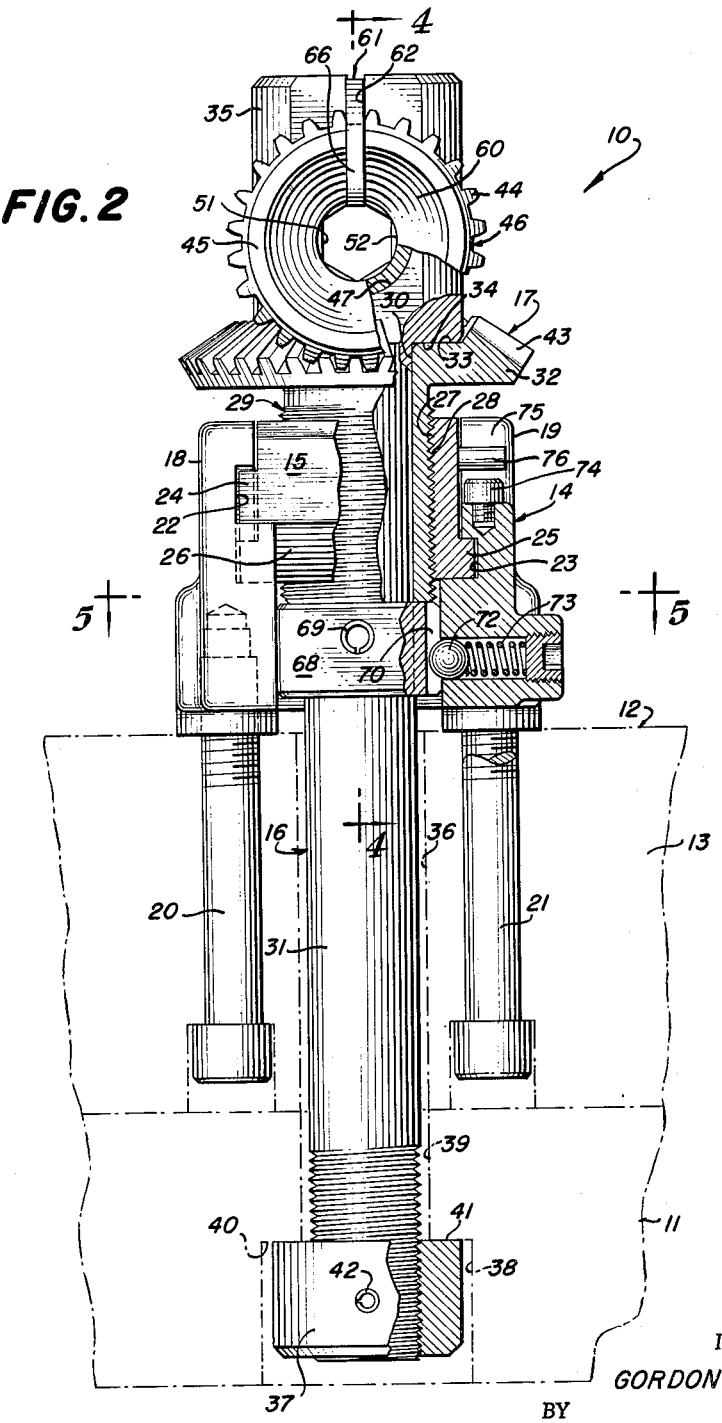
INVENTOR.
GORDON M. SOMMER
BY
Marzall, Johnston, Cook & Root
ATTORNEYS April 3, 1962 G. M. SOMMER 3,027,793
DIE CLAMP
Filed Dec. 31, 1957 3 Sheets-Sheet 3

INVENTOR.
GORDON M. SOMMER
BY
Marzall, Johnston, Cook & Root
ATTORNEYS.

United States Patent Office 3,027,793
Patented Apr. 3, 1962

3,027,793
DIE CLAMP
Gordon M. Sommer, Hinsdale, Ill., assignor to U.S. Industries, Inc., New York, N.Y., a corporation of Delaware
Filed Dec. 31, 1957, Ser. No. 706,525
13 Claims. (Cl. 83—698)

This invention relates in general to a device for clamping a pair of members together, and more particularly to a device for clamping a die to a movable slide of a metal working press.

Because of new developments in the field of metal working presses wherein greater production per press is a demand of the industry, it has been proposed to reduce the shut down time of a press when changing the dies. One way to reduce this shut down time is to reduce the time it takes to connect and disconnect the upper die to the movable slide of a metal working press.

Accordingly, the present invention provides a device for quickly clamping or unclamping the upper die to the movable slide, although other uses and purposes will be apparent to one skilled in the art.

It is therefore an object of this invention to provide a device for clamping a pair of members together.

Another object of this invention resides in the provision of a device capable of quickly and easily clamping or unclamping an upper die to a movable slide of a metal working press.

Still another object of this invention is in the provision of a die clamp for use on metal working presses for quickly and easily tightly securing the upper die of a die set to a movable slide and for releasing it therefrom.

A further object of this invention is to provide a mechanical die clamp operable by the application of a wrench which may be manipulated to quickly and easily secure a die to a movable slide on the metal working press or release it therefrom and which may be locked in clamped or unclamped position.

A still further object of this invention is in the provision of a mechanical die clamp for quickly and easily securing a die to a movable slide of a metal working press, wherein the clamp is operable by a wrench, and the initial application of the wrench automatically unlocks the die clamp so that it may be displaced to unclamping position.

Other objects, features and advantages of the invention will be apparent from the following detailed disclosure, taken in conjunction with the accompanying sheets of drawings, wherein like reference numerals refer to like parts, in which:

FIG. 2 is an enlarged front elevational view of the die clamp, with certain parts broken away and other parts in section to show underlying parts;

Figure 3:
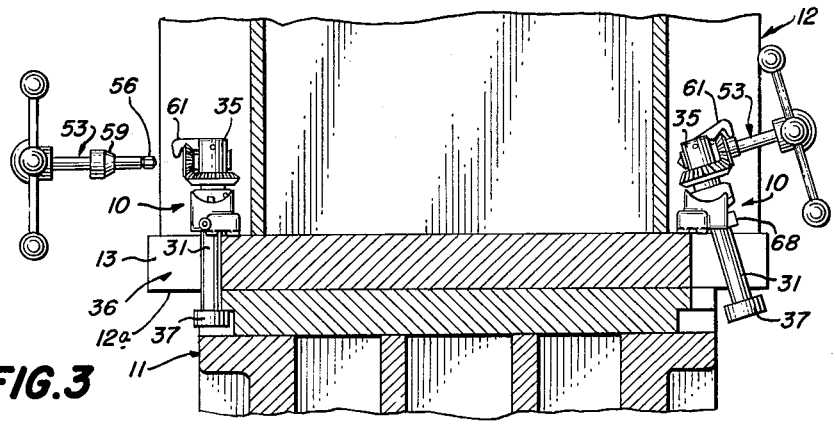
FIG. 3 is a fragmentary and partially sectional view of a slide in a press and die engaging the face of the slide, and illustrating on one side of the slide a die clamp of the present invention in clamping position and at the other side of the slide a die clamp of the present invention in unclamped position.

Referring to the drawings, the clamping device or die clamp of the present invention, generally indicated by the numeral 10, is illustrated as being employed to clamp an upper die or punch 11 to a movable slide 12 of a metal working press, although it will be appreciated that this clamping device may be similarly applied for the purpose of quickly clamping or releasing any two or more members together. It may be further noted in FIG. 3 that generally a plurality of die clamps 10 are provided to clamp the die to the slide, the number depending upon the design and size of a press structure. For purposes of illustration, the left-hand die clamp in FIG. 3 is shown in clamped position wherein the die is tightly clamped to the face 12a of the slide 12, and the right-hand die clamp is in an unclamped position, which position would be such as to allow the die 11 to be released from the slide 12.

The die clamps as herein illustrated are mounted on an outwardly extending flange 13 of the slide 12 in a manner to be more clearly hereinafter explained.

Each die clamp 10 includes generally a support bracket 14, a supporting block 15 slidably mounted on the support bracket, a clamping bolt or locking arm 16 carried by the supporting block 15, and a gearing arrangement 17 which effects axial displacement of the clamping bolt relative to the supporting block and upper slide 12.

The support bracket 14 includes parallel spaced upright bars 18 and 19 mounted atop the flange 13 of the slide 12 and each secured thereto by one or more bolts 20 and 21, respectively, FIG. 2. The upright bars are further provided with opposed inwardly opening arcuate tracks or grooves 22 and 23.

Figure 1:
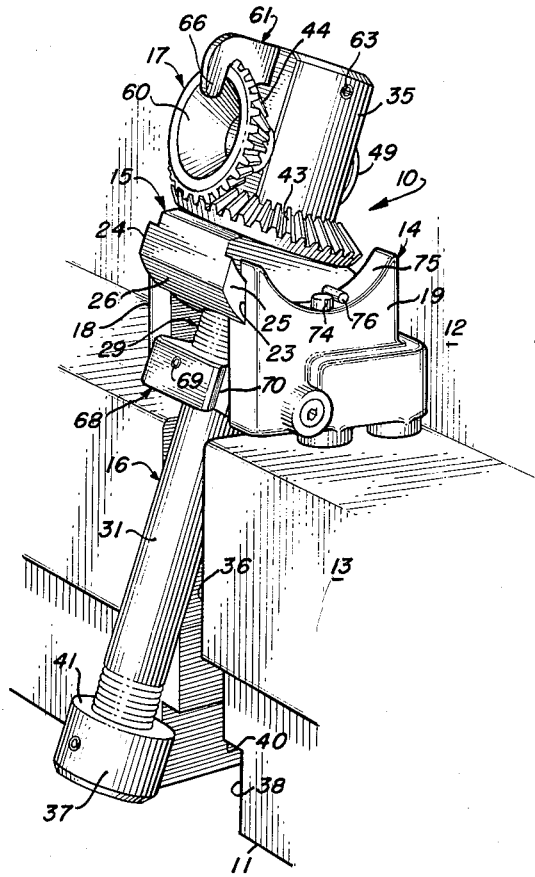
FIG. 1 is a perspective view of the die clamp according to the invention and mounted on a slide of a metal working press, and showing the clamping bolt as being in disengaged position relative to a die.

These tracks 22 slidably receive opposed and outwardly extending projections or flanges 24 and 25 formed on the supporting block 15. The supporting block 15 is substantially rectangularly shaped in plan view and provided with an arcuate bottom face 26 which is contiguous with the bottom edges of the arcuate projections 24 and 25 as seen in FIG. 1. Thus, the supporting block 15 may move along an arcuate path relative to the support bracket 14 by virtue of the arcuate tracks and projections. In effect, the supporting block 15 is slidably carried between the uprights 18 and 19 of the support bracket 14.

Figure 4:
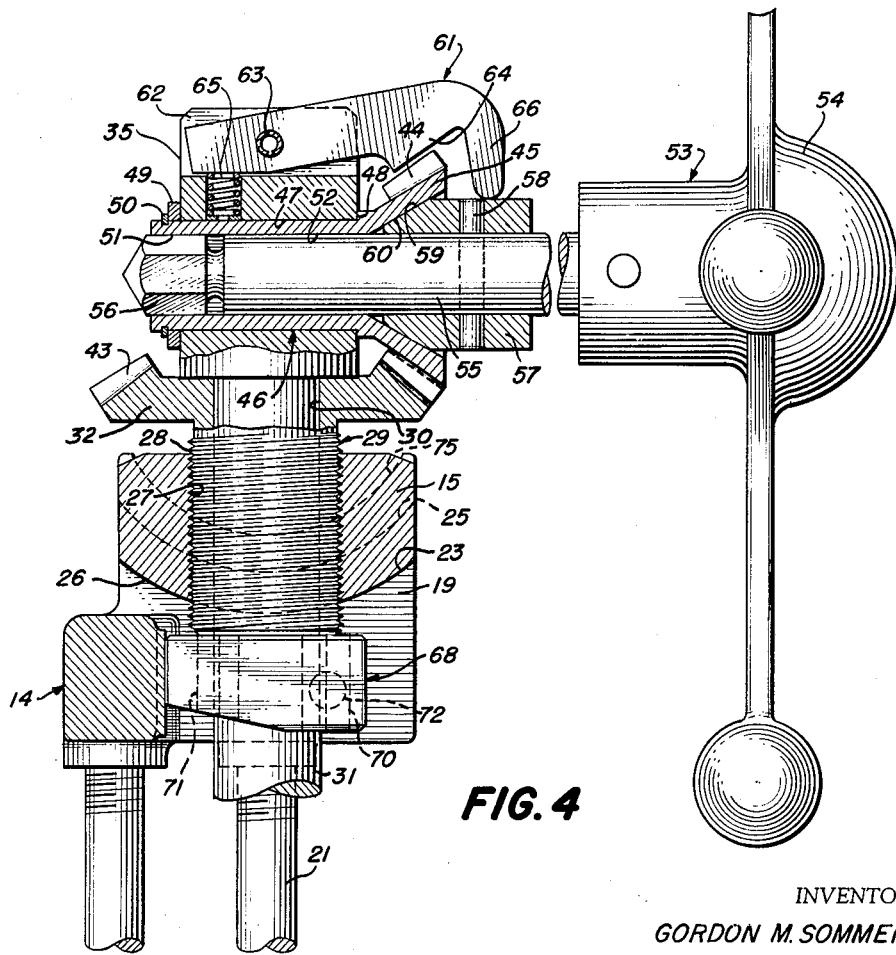
FIG. 4 is a sectional view, taken substantially along lines 4—4 of FIG. 2.

The support bracket 15 has a threaded bore 27, FIG. 4, extending therethrough which threadedly engages an externally threaded portion 28 of a hollow shaft 29 that constitutes a part of the gearing arrangement for displacing the clamping bolt relative to the slide. The hollow shaft 29 is further provided with a smooth bore 30 extending therethrough which rotatably receives the main shank 31 of the clamping bolt 16.

The upper end of the hollow shaft 29 carries an outwardly extending radial flange 32 which defines at its upper very end an upwardly facing annular shoulder 33, FIG. 2, which engages a downwardly facing annular shoulder 34 formed by an enlarged portion 35 at the upper end of a clamping bolt 16.

As may be noted particularly in FIGS. 1, 2, and 3, the upright bars 18 and 19 of the support bracket 14 effectively straddle a vertically arranged and outwardly opening groove 36 formed in the flange 13 of the slide 12 for reception of the main shank of the clamping bolt 16. The lower end of the clamping bolt 16 threadedly receives a cylindrically shaped head 37 which is adapted to be received in an enlarged outwardly opening recess 38 formed in the upper end of the die 11 below a clamping bolt groove 39, FIG. 2, of smaller width. Between the grooves 38 and 39, a shoulder 40 is defined for engaging the upwardly facing annular face 41 defined on the head 37, FIG. 2. By virtue of the head 37 being threadedly received on the lower end of the clamping bolt 16, the head may be adjustably positioned relative to the clamping bolt, and a set screw 42, FIG. 2, is provided for locking the head in position on the clamping bolt 16.

The flange 32 on the hollow shaft 29 is further provided with a bevel gear 43 which meshes with a bevel gear 44 formed on a conical flange 45 of a second hollow shaft 46, FIG. 4. This hollow shaft 46 is journalled in a smooth bore 47 formed in the enlarged portion 35 of the clamping bolt 16 and extends at right angles to the hollow shaft 29. At one end of the hollow shaft 46, a cylindrically enlarged portion defines a shoulder 48 engaging one side of the enlarged portion 35, while a washer or ring 49 held on the other end of the shaft by a locking ring 50 engages the other side of the enlarged portion 35. Thus, rotation of the hollow shaft 46 rotates the hollow shaft 29 through the double gears 43 and 44 in order to axially displace the clamping bolt 16 relative to the supporting block 15 and slide 12.

Figure 7:
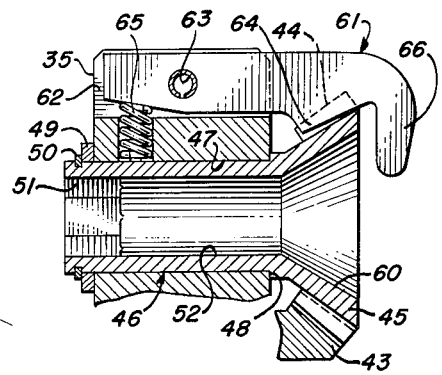
FIG. 7 is an enlarged fragmentary sectional view similar to the upper portion of FIG. 4 with the wrench removed and illustrating the locking arm in locked position.
Figure 6:
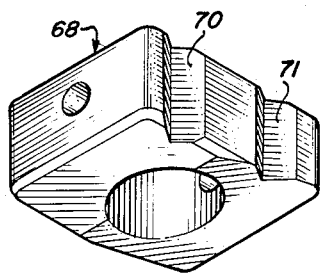
FIG. 6 is an enlarged perspective view of the collar of FIG. 5.

Referring now to FIG. 4 and FIG. 7, the hollow shaft 46 includes a hexagonal socket or wrench receiving portion 51 and a smooth cylindrical bore 52 which acts as a wrench guide. For operating the hollow shaft 46, a wrench of special construction, generally designated by the numeral 53 is provided which includes a handle 54 for operating same, a cylindrical shank 55 extending from the handle, and a hexagonal end section 56 spaced outwardly from the cylindrical section or shank 55. Further, a collar 57 is secured to the portion of the cylindrical shank 55 remote from the hex head 56 by means of a pin 58. This collar is provided at its outer end with a conical face 59.

It will be appreciated that the shank 55 may be of any desired length depending upon the type of press the die clamp of the present invention is employed upon. Normally, the wrench will not be associated with the die clamp during the time when the press is in operation and the die clamps are in clamping position. When applying the wrench 53 to a die clamp, the hex head 56 is inserted into the hollow bore 52 of the hollow shaft 46 and into engagement with the hexagonal wrench engaging portion 51 of a shaft. The proper positioning of the hex head 56 with the hex socket 51 is obtained by location of the collar 57 on the shank 55 wherein the conical face 59 of the collar 57 engages a similarly contoured conical face 60 of the conical flange 45 on the hollow shaft 46. Further, the cylindrical shank 55 and the conical face of the collar 57 serve to guide the wrench and give it additional support when operating the wrench to rotate the shaft 46.

Since it is necessary to lock the die clamp into position during operation of the press, a locking bar or detent 61 is arranged in a transverse bifurcation or slot 62 on the upper end of the clamping bolt 16, FIG. 4, and FIG. 7, and pivotally mounted within the bifurcation by means of a pin 63. This locking bar is provided with a section 64 at the front end thereof capable of being received between a pair of adjacent teeth on the bevel gear 44. A spring 65 mounted within the enlarged section 35 bears at one end against the section and at the other end against the outer end of the locking bar 61 to normally bias the locking bar into locked or engaged position with the bevel gear 44. A finger 66 extends downwardly from the front end of the locking bar 61 to be engaged by and cammed upwardly by the inclined face 59 on the collar 57 of the wrench 53, whereby normal insertion of the wrench 53 cams the finger 66 and locking bar 61 upwardly against the biasing of the spring 65 to automatically unlock the bevel gear 44 and the clamping bolt 16 so that rotation of the wrench 53 may effect operation of the die clamp.

Figure 5:
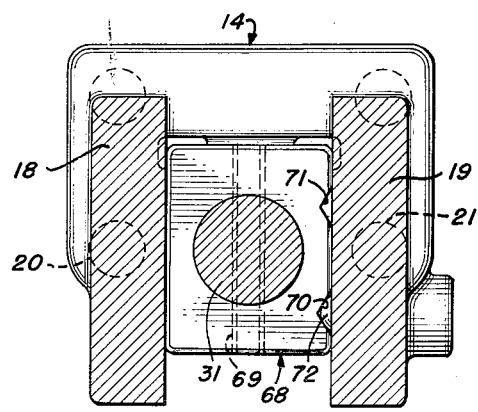
FIG. 5 is a sectional view, taken substantially along line 5—5 of FIG. 2.

While the first hollow shaft 29 is rotatably associated with the shaft 31 of the clamping bolt 16, it is not permitted to move axially of the shank due to the shoulder 34 on the enlarged section 35 at the top of the clamping bolt, and due to a rectangularly shaped collar 68 secured to the shank 31 by a pin 69, FIG. 5, and abutting the bottom end of the hollow shaft 29 as seen in FIGS. 2 and 4. This collar further serves to lock the clamping bolt 16 and the supporting block 15 into a vertical position as seen at the left-hand end in FIG. 3 or an inclined position as seen at the right-hand end of FIG. 3 and FIG. 1, and is therefore provided at one side thereof with front and back parallel spaced V-shaped grooves 70 and 71. These grooves extend vertically and may be selectively aligned with a ball detent 72 spring biased by a spring 73, FIG. 2, toward the collar 68, FIG. 2. The ball detent 72 and spring 73 are mounted in the upright bar 19 of the support bracket 14. Thus, when the clamping bolt 16 is vertically positioned to clamp the die to the slide as shown in the left-hand side of FIG. 3, the ball detent 72 will be engaging the front groove 70, and while the clamping bolt 16 is inclined out of engagement with the die 11 as shown on the right-hand side of FIG. 3, the ball detent 72 will be engaging the rear groove 71 thereby locking the clamping bolt in position. Inasmuch as only a spring lock is effected by this locking arrangement, it is only necessary to apply enough force in either direction to overcome the force of the spring 73 in order to swing the clamping bolt between clamping and unclamping position. To further limit the outward swing of the clamping bolt 16, a stop 74 is mounted on the upper arcuate edge 75 of the upright bar 19 of the support bracket which is adapted to engage a stop pin 76 carried by the supporting block 15.

Operation of the die clamp 10 is simple and quick. When it is desired to remove the upper die 11 from the slide 12, operation of the die clamp includes first the insertion of the wrench 53 into the die clamp wherein the stop collar 57 properly positions a hexagonal end 56 in the hexagonal socket 51 of the hollow shaft 46 and the inclined surface 59 of the collar 57 further engages the finger 66 of the locking bar 61 to disengage the bar from the teeth of the bevel gear 44 thereby unlocking the clamping bolt. Subsequent rotation of the handle 54 of the wrench 53 in the proper direction effects a downward displacement of the clamping bolt 16 to space the head 37 from the shoulder 40 of the slide 11. Then with an upward force being applied against the handle 54 of the wrench 53, the clamping bolt 16 and the supporting block 15 are swung outwardly to lock the clamping bolt into an unclamped position by means of the spring pressed ball detent 72 which then engages the rear groove 71 of the collar 68 wherein the die clamping bolt takes the position as seen at the right-hand end of FIG. 3. A mere reversal of operation effects further clamping of the die clamp to secure the die or a new die 11 to the slide 12.

It will be understood that modifications and variations may be effected without departing from the scope of the novel concepts of the present invention, but it is understood that this application is to be limited only by the scope of the appended claims.

The invention is hereby claimed as follows.

1. A clamping device adapted to clamp two members together comprising, a pair of spaced upstanding support bars mounted on one member, opposed arcuate grooves in said bars, a supporting block having opposed arcuate projections slidably received in said grooves whereby said block is movable along an arc relative to said support bars, a clamping bolt carried by said block and axially movable relative thereto, said bolt selectively engageable with said other member, and means coacting with said supporting block and said clamping bolt for moving said bolt relative to said block between clamping and unclamping positions.

2. A clamping device adapted to clamp two members together comprising, a pair of spaced upstanding support bars mounted on one member, opposed arcuate grooves in said bars, a supporting block having opposed arcuate projections slidably received in said grooves whereby said block is movable along an arc relative to said support bars, a bore extending through said supporting block, a clamping bolt freely received in said bore, said clamping bolt selectively engageable with said other member, and means coacting with said supporting block and said clamping bolt for moving said bolt relative to said block between clamping and unclamping positions.

3. A clamping device adapted to clamp two members together comprising, a pair of spaced upstanding support bars mounted on one member, opposed arcuate grooves in said bars, a supporting block having opposed arcuate projections slidably received in said grooves whereby said block is movable along an arc relative to said support bars, a bore extending through said supporting block, a clamping bolt freely received in said bore, said clamping bolt selectively engageable with said other member, and means threadedly received in said bore and engaging said clamping bolt for moving said bolt relative to said block between clamping and unclamping position.

4. A clamping device adapted to clamp two members together comprising, a pair of spaced upstanding support bars mounted on one member, opposed arcuate grooves in said bars, a supporting block having opposed arcuate projections slidably received in said grooves whereby said block is movable along an arc relative to said support bars, a bore extending through said supporting block, a clamping bolt freely received in said bore, said clamping bolt selectively engageable with said other member, a sleeve threadedly received in said bore having a shoulder in engagement with said clamping bolt, and means for rotating said sleeve for moving said block between clamping and unclamping position.

5. A clamping device adapted to clamp two members together comprising, a pair of spaced upstanding support bars mounted on one member, opposed arcuate grooves in said bars, a supporting block having opposed arcuate projections slidably received in said grooves whereby said block is movable along an arc relative to said support bars, a bore extending through said supporting block, a clamping bolt freely received in said bore, said clamping bolt selectively engageable with said other member, said clamping bolt having an enlarged portion at its upper end defining an annular shoulder, a hollow rod encircling said clamping bolt and threadedly received in said bore, said rod having a shoulder at its upper end engaging said annular shoulder of the clamping bolt, and means for rotating said rod to move the bolt relative to the block between clamping and unclamping position.

6. A clamping device adapted to clamp two members together comprising, a pair of spaced upstanding support bars mounted on one member, opposed arcuate grooves in said bars, a supporting block having opposed arcuate projections slidably received in said grooves whereby said block is movable along an arc relative to said support bars, a bore extending through said supporting block, a clamping bolt freely received in said bore, said clamping bolt selectively engageable with said other member, said clamping bolt having an enlarged portion at its upper end defining an annular shoulder, a hollow rod encircling said clamping bolt and threadedly received in said bore, said rod having a shoulder at its upper end engaging said annular shoulder of the clamping bolt, a bevel gear on said rod, and a second bevel gear having its axis perpendicular to the first bevel gear rotatably journalled in said enlarged portion of the clamping bolt, said second bevel gear having a wrench engaging portion adapted to be selectively engaged by a wrench for operating said device and moving said bolt between clamping and unclamping position.

7. A clamping device adapted to clamp two members together comprising, a pair of spaced upstanding support bars mounted on one member, opposed arcuate grooves in said bars, a supporting block having opposed arcuate projections slidably received in said grooves whereby said block is movable along an arc relative to said support bars, a bore extending through said supporting block, a clamping bolt freely received in said bore, said clamping bolt selectively engageable with said other member, said clamping bolt having an enlarged portion at its upper end defining an annular shoulder, a hollow rod encircling said clamping bolt and threadedly received in said bore, said rod having a shoulder at its upper end engaging said annular shoulder of the clamping bolt, a bevel gear on said rod, and a second bevel gear having its axis perpendicular to the first bevel gear rotatably journalled in said enlarged portion of the clamping bolt, said second bevel gear having a wrench engaging portion adapted to be selectively engaged by a wrench for operating said device and moving said bolt between clamping and unclamping position, and means for locking said gears against rotation thereby locking the bolt in a given position.

8. A clamping device adapted to clamp two members together comprising, a pair of spaced upstanding support bars mounted on one member, opposed arcuate grooves in said bars, a supporting block having opposed arcuate projections slidably received in said grooves whereby said block is movable along an arc relative to said support bars, a bore extending through said supporting block, a clamping bolt freely received in said bore, said clamping bolt selectively engageable with said other member, said clamping bolt having an enlarged portion at its upper end defining an annular shoulder, a hollow rod encircling said clamping bolt and threadedly received in said bore, said rod having a shoulder at its upper end engaging annular shoulder of the clamping bolt, a bevel gear on said rod, and a second bevel gear having its axis perpendicular to the first bevel gear rotatably journalled in said enlarged portion of the clamping bolt, said second bevel gear having a wrench engaging portion adapted to be selectively engaged by a wrench for operating said device and moving said bolt between clamping and unclamping position, and means for locking said gears against rotation thereby locking the bolt in a given position, said latter means including a detent normally biased into engagement with the teeth of one of said gears, but being automatically disengaged upon application of a wrench to said wrench engaging position of said second gear.

9. In a press having a movable slide and a die mountable thereon, a die clamp for clamping said die to said slide, said die clamp comprising, a support bracket including a pair of parallel upright bars mounted on said slide, said bars having opposed arcuate tracks, a supporting block having opposed track engaging means slidably supported by said tracks, said block having a threaded bore therein, a hollow shaft threadedly received in said bore and having an annular shoulder, a clamping bolt freely received in said hollow shaft and having an annular shoulder engaging the annular shoulder of said shaft, the slide and die having aligned grooves for receiving the clamping bolt and the clamping bolt having a head at its lower end adapted to engage a shoulder on said die, and means for rotating said shaft to move the clamping bolt relative to said block and slide, whereby swinging of said block along the tracks of said upright bars likewise swings said bolt into and out of clamping position relative to said die.

10. In a press having a movable slide and a die mountable thereon, a die clamp for clamping said die to said slide, said die clamp comprising, a support bracket including a pair of parallel upright bars mounted on said slide, said bars having opposed arcuate tracks, a supporting block having opposed track engaging means slidably supported by said tracks, said block having a threaded bore therein, a hollow shaft threadedly received in said bore and having an upwardly facing annular shoulder, a clamping bolt received in said hollow shaft and having a downwardly facing annular shoulder engaging said upwardly facing annular shoulder of said hollow shaft, the slide and die having aligned grooves for receiving the clamping bolt and the clamping bolt having a head at its lower end adapted to engage a downwardly facing shoulder on said die, and means for rotating said shaft to axially displace said bolt relative to said block and slide including a first bevel gear on said shaft and a second shaft journalled in said clamping bolt having a second bevel gear meshing with the first bevel gear, said second shaft having a tool engaging portion adapted to be selectively engaged by a tool for operating said clamp between clamping and unclamping positions.

11. In a press having a movable slide and a die mountable thereon, a die clamp for clamping said die to said slide, said die clamp comprising, a support bracket including a pair of parallel upright bars mounted on said slide, said bars having opposed arcuate tracks, a supporting block having opposed track engaging means slidably supported by said tracks, said block having a threaded bore therein, a hollow shaft threadedly received in said bore and having an upwardly facing annular shoulder, a clamping bolt received in said hollow shaft and having a downwardly facing annular shoulder engaging said upwardly facing annular shoulder of said hollow shaft, the slide and die having aligned grooves for receiving the clamping bolt and the clamping bolt having a head at its lower end adapted to engage a downwardly facing shoulder on said die, and means for rotating said shaft to axially displace said bolt relative to said block and slide including a first bevel gear on said shaft and a second shaft journalled in said clamping bolt having a second bevel gear meshing with the first bevel gear, said second shaft having a tool engaging portion adapted to be selectively engaged by a tool for operating said clamp between clamping and unclamping positions and means for locking said shafts against rotation.

12. In a press having a movable slide and a die mountable thereon, a die clamp for clamping said die to said slide, said die clamp comprising, a support bracket including a pair of parallel uprright bars mounted on said slide, said bars having opposed arcuate tracks, a supporting block having opposed track engaging means slidably supported by said tracks, said block having a threaded bore therein, a hollow shaft threadedly received in said bore and having an upwardly facing annular shoulder, a clamping bolt received in said hollow shaft and having a downwardly facing annular shoulder engaging said upwardly facing annular shoulder of said hollow shaft, the slide and die having aligned grooves for receiving the clamping bolt and the clamping bolt having a head at its lower end adapted to engage a downwardly facing shoulder on said die, means for rotating said shaft to axially displace said bolt relative to said block and slide including a first bevel gear on said shaft and a second shaft journalled in said clamping bolt having a second bevel gear meshing with the first bevel gear, said second shaft having a tool engaging portion adapted to be selectively engaged by a tool for operating said clamp between clamping and unclamping positions, and a locking bar mounted on said clamping bolt for engaging one of said gears to prevent rotation thereof thereby locking the clamping bolt in position.

13. In a press having a movable slide and a die mountable thereon, a die clamp for clamping said die to said slide, said die clamp comprising, a support bracket including a pair of parallel upright bars mounted on said slide, said bars having opposed arcuate tracks, a supporting block having opposed track engaging means slidably supported by said tracks, said block having a threaded bore therein, a hollow shaft threadedly received in said bore and having an upwardly facing annular shoulder, a clamping bolt received in said hollow shaft and having a downwardly facing annular shoulder engaging said upwardly facing annular shoulder of said hollow shaft, the slide and die having aligned grooves for receiving the clamping bolt and the clamping bolt having a head at its lower end adapted to engage a downwardly facing shoulder on said die, means for rotating said shaft to axially displace said bolt relative to said block and slide including a first bevel gear on said shaft and a second shaft journalled in said clamping bolt having a second bevel gear meshing with the first bevel gear, said second shaft having a tool socket, and a resiliently biased locking bar normally engaging the teeth of said second gear but being disengaged automatically by application of the tool to the socket.

References Cited in the file of this patent
UNITED STATES PATENTS

| | | |
|---|---|---|
| 922,122 | Frazier | May 18, 1909 |
| 1,008,146 | Herriman | Nov. 7, 1911 |
| 1,222,549 | Lark | Apr. 10, 1917 |
| 1,840,483 | Brown et al. | Jan. 12, 1932 |
| 1,898,343 | Davidson | Feb. 21, 1933 |
| 2,039,369 | Travani | May 5, 1936 |
| 2,133,197 | Innocenti | Oct. 11, 1938 |
| 2,233,458 | Segre | Mar. 4, 1941 |
| 2,678,786 | Kindorf | May 18, 1954 |
| 2,710,223 | Dussault | June 7, 1955 |
| 2,762,514 | McGinn | Sept. 11, 1956 |

FOREIGN PATENTS

| | | |
|---|---|---|
| 102,799 | Australia | Dec. 20, 1937 |
| 142,333 | Sweden | Sept. 29, 1953 |